J. R. FLANNERY.
STAY BOLT STRUCTURE FOR BOILERS.
APPLICATION FILED FEB. 23, 1921.
1,428,541. Patented Sept. 12, 1922.
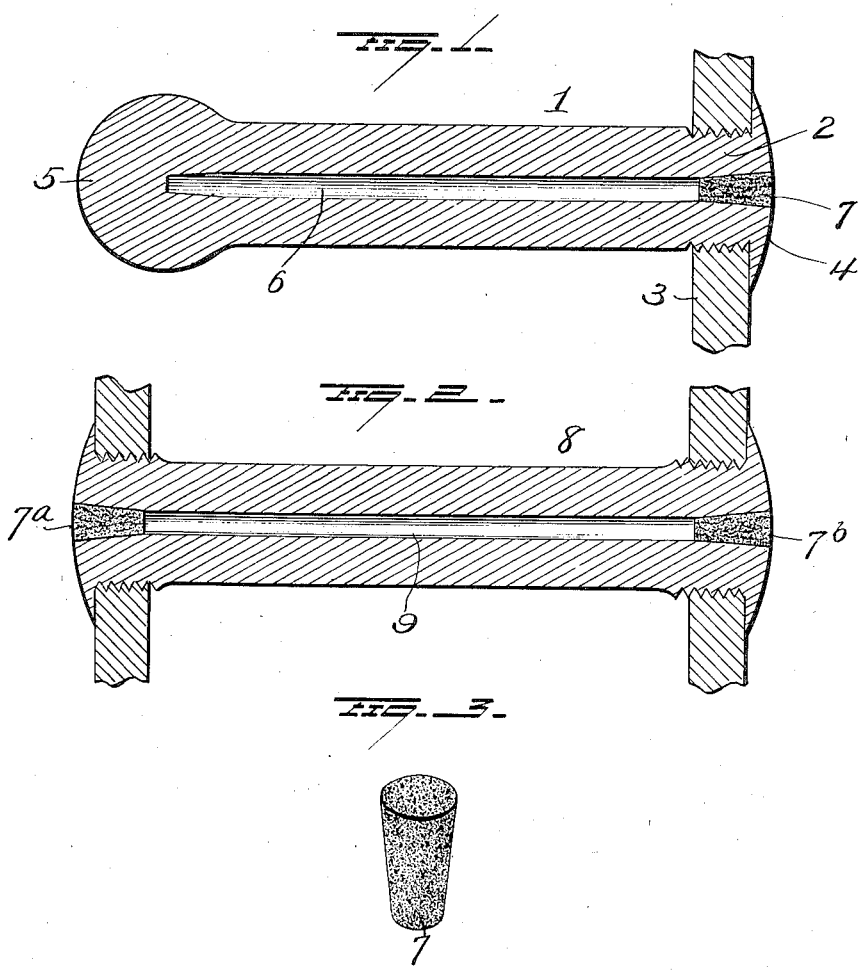

Patented Sept. 12, 1922.

1,428,541

UNITED STATES PATENT OFFICE.

JOHN ROGERS FLANNERY, OF PITTSBURGH, PENNSYLVANIA, ASSIGNOR TO FLANNERY BOLT COMPANY, OF PITTSBURGH, PENNSYLVANIA.

STAY-BOLT STRUCTURE FOR BOILERS.

Application filed February 23, 1921. Serial No. 447,067.

*To all whom it may concern:*

Be it known that I, JOHN ROGERS FLANNERY, a citizen of the United States, and a resident of Pittsburgh, in the county of Allegheny and State of Pennsylvania, have invented certain new and useful Improvements in Stay-Bolt Structures for Boilers; and I do hereby declare the following to be a full, clear, and exact description of the invention, such as will enable others skilled in the art to which it appertains to make and use the same.

This invention relates to improvements in staybolt structures for boilers.

In the construction of staybolts for boilers, it has been the custom to provide such bolts with tell-tale holes at either end of the bolt or a continuous bore extending through the bolt and in the case of flexible bolts it has been proposed to provide bolts with tell-tale holes extending from the inner or fire box end continuously to the headed end and permanently closed within said headed end of the bolt. It has also been proposed to temporarily close the inner end of the tell-tale hole with a plug which can be removed or bored out to obtain access to the tell-tale hole for ascertaining whether water has entered the hole by reason of a rupture of the bolt, or provide a plug of a material which is sensitive to the action of water.

The object of my present invention is to provide a closure for the inner or fire-box end of the tell-tale hole of a staybolt, which will prevent the entrance of soot, scale or other foreign solid particles into the tell-tale hole but which will, at the same time be sufficiently porous to permit water to pass or filter through the passages or pores of said closure in the event that water enters the tell-tale hole through a pin-hole defect, or slight rupture of the bolt to denote that such defect or rupture exists. If the fracture of the bolt be of considerable size pressure within the tell-tale hole should operate to blow out the closure and permit the free escape of the fluid, thus denoting the serious character of the rupture.

With this object in view, the invention consists in a staybolt having a tell-tale hole closed at its outer end and provided at the inner end of said hole with a porous closure.

The invention further consists in certain novel features as hereinafter set forth and pointed out in the claims.

In the accompanying drawings, Figure 1 is a sectional view of a staybolt showing an embodiment of my invention with a staybolt of the "flexible" type; Figure 2 is a view showing application of the invention to a rigid staybolt and Figure 3 is a separate view of the temporary porous closure.

1 represents the body of a staybolt of the "flexible" type which may be threaded at its inner end 2 to be screwed through an inner boiler sheet 3 and upset as at 4. The bolt is provided at its outer end with a head 5 for flexible connection with an outer boiler sheet or a suitable bearing device carried thereby. The body of the bolt is provided with a longitudinal bore or tell-tale hole 6 extending from the inner end of the bolt body continuously to the headed end of the bolt and terminating within said headed end where it is permanently closed.

A plug 7 is inserted preferably temporarily into the inner end of the tell-tale hole 6 and serves to prevent the entrance of soot, scale or other foreign solid particles into the tell-tale hole, but said plug is of such construction that it will also permit water to filter, percolate or pass in small streams through it in the event that a comparatively small amount of water should find its way into the tell-tale hole through a pin-hole or minute rupture in the bolt,—the water thus exuding through the plug 7 serving to give warning of the slight imperfection of the bolt. The temporary plug is so fitted into the inner end of the tell-tale hole that when the bolt becomes sufficiently ruptured to permit the entrance of considerable fluid within the tell-hole, the pressure which will accumulate in the latter may cause the plug to be blown out, thus permitting the free exit of water from the tell-tale hole and thereby denoting a serious rupture of the bolt. It is not essential that the plug be blown out, as the passage or percolation of water through the plug will denote a ruptured condition of the bolt, and hence the porous plug may be a permanent instead of a temporary one.

The porous plug 7 may be composed of granular material which is insoluble in water,—such for example as sand. When sand is employed in the construction of the plug, it may be formed into proper shape and then subjected to heat to a degree considerably above the maximum degree of heat to which it and the inner end of the staybolt will be subjected when in use in a boiler construction. It is evident that material of granular form other than sand might be employed,—the essential feature of the plug being that it will be of a porous nature or have numerous minute passages through which water may exude and still prevent the entrance of foreign solid particles into the tell-tale hole of the bolt.

In Figure 2, a bolt 8 of the "rigid" type is shown as having a tell-tale hole 9 extending from end to end, and porous plugs 7ª 7ᵇ which may be constructed as hereinbefore explained are inserted in respective ends of said tell-tale hole.

Having fully described my invention what I claim as new and desire to secure by Letters-Patent, is:—

1. A staybolt having a tell-tale hole provided with a porous closure.

2. A staybolt having a tell-tale hole closed at one end, and a plug in the other end of the staybolt constructed of granular material through which water or steam may percolate.

3. A staybolt having a tell-tale hole closed at one end, and a temporary granular plug fitted in the other end of the tell-tale hole and adapted to be blown out by pressure in said tell-tale hole, said plug having minute passages through the same.

4. A staybolt having a tell-tale hole closed at one end, and a temporary porous plug fitted in the other end of the tell-tale hole and adapted to be blown out by pressure in said tell-tale hole.

5. A staybolt having a tell-tale hole and an insoluble closure in the latter having passages for fluid.

6. A staybolt having a tell-tale hole and an insoluble closure for the latter, said closure having a structure adapted to permit fluid to pass through it.

In testimony whereof, I have signed this specification in the presence of two subscribing witnesses.

JOHN ROGERS FLANNERY.

Witnesses:
J. R. HORAN,
F. H. ALLISON.